US012586510B2

(12) United States Patent
Kim et al.

(10) Patent No.: US 12,586,510 B2
(45) Date of Patent: Mar. 24, 2026

(54) DISPLAY DEVICE

(71) Applicant: LG Display Co., Ltd., Seoul (KR)

(72) Inventors: Minhoi Kim, Paju-si (KR); Taegung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 227 days.

(21) Appl. No.: 18/498,399

(22) Filed: Oct. 31, 2023

(65) Prior Publication Data

US 2024/0257705 A1 Aug. 1, 2024

(30) Foreign Application Priority Data

Jan. 31, 2023 (KR) ........................ 10-2023-0012225

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01);
(Continued)

(58) Field of Classification Search
CPC ............... G09G 3/2096; G09G 3/3233; G09G 2300/0819; G09G 2300/0842; G09G 2310/0243; G09G 2310/061; G09G 2310/08; G09G 2320/0247; G09G 2320/045; G09G 2310/06; G09G 2320/0295; G09G 2340/0435; G09G 3/3225; G09G 3/2018; G09G 2320/0233; G09G 2340/16; G09G 3/3208; G09G 2330/021
See application file for complete search history.

(56) References Cited

U.S. PATENT DOCUMENTS 9,424,805 B2 * 8/2016 Lee .......................... G09G 5/12
2015/0264298 A1 * 9/2015 Colenbrander ........ G09G 5/001 345/547

(Continued)

FOREIGN PATENT DOCUMENTS

WO WO 2022/030788 A1 2/2022

OTHER PUBLICATIONS

Intellectual Property Office of the United Kingdom, Combined Search and Examination Report with Written Opinion, United Kingdom Patent Application No. GB2319642.1, Oct. 17, 2024, 12 pages.

*Primary Examiner* — Bryan Earles
(74) *Attorney, Agent, or Firm* — Fenwick & West LLP

(57) ABSTRACT

A display device is disclosed that includes a display panel having pixels configured to display images during a first frame, a second frame, and a third frame, each of the first frame, the second frame, and the third frame including an active period and a blanking period; a counting circuit configured to count a duration of the blanking period of the first frame after the active period of the first frame; a comparison circuit configured to compare the counted duration of the blanking period of the first frame with a threshold time required for sensing at least one pixel or a threshold time required to prepare for driving the pixels during the second frame; and a delay decision circuit configured to determine whether to increase a duration of the blanking period of the first frame based on the comparison.

19 Claims, 9 Drawing Sheets

(52) U.S. Cl.
CPC ............... *G09G 2300/0842* (2013.01); *G09G 2310/0243* (2013.01); *G09G 2310/061* (2013.01); *G09G 2310/08* (2013.01); *G09G 2320/0247* (2013.01); *G09G 2320/045* (2013.01)

(56) References Cited

U.S. PATENT DOCUMENTS

| | | | | |
|---|---|---|---|---|
| 2015/0355762 | A1* | 12/2015 | Tripathi | H04N 3/24 345/173 |
| 2022/0093048 | A1* | 3/2022 | Lee | G09G 3/3275 |
| 2022/0284860 | A1* | 9/2022 | Lin | G09G 3/3266 |
| 2023/0298524 | A1* | 9/2023 | Cho | G09G 3/3225 345/691 |

* cited by examiner

DISPLAY DEVICE

CROSS-REFERENCE TO RELATED APPLICATION

The present application claims priority to Republic of Kore Patent Application No. 10-2023-0012225, filed on Jan. 31, 2023, which is incorporated by reference in its entirety.

BACKGROUND

Technical Field

The present disclosure relates to a display device.

Description of Related Art

With the progress of the information-oriented society, various types of demands for display devices which display an image are increasing. Further, various types of display devices such as a liquid crystal display device, and an organic light emitting display device have been used.

The images displayed in the display device may be still images or moving images. If the images are moving images, the images may be various kinds such as sports images, game images, movies, and the like. The display device may reduce power consumption and extend its lifespan when the display device is driven in a variable refresh rate (VRR) mode that varies the driving frequency depending on kinds of images.

When there is little change in an input image on the display device, the pixels may be driven at a low frequency (e.g., driving at a low speed) to reduce power consumption of the display device. However, when the pixels are driven at a low speed, difference in pixel brightness may occur due to discharge of voltages of the pixels, thereby quality deterioration such as image distortion, flicker and the like may occur.

SUMMARY

An object of the embodiments is to provide a display device capable of securing a sensing period and/or a driving preparation period during a vertical blanking period.

The objects of the embodiments of the present disclosure are not limited to the above-mentioned object, and the other technical object may be inferred from the embodiments described below.

In one embodiment, a display device comprises: a display panel including a plurality of pixels configured to display images during a first frame, a second frame that is after the first frame, and a third frame that is after the second frame, each of the first frame, the second frame, and the third frame including an active period and a blanking period that is after the active period: a counting circuit configured to count a duration of the blanking period of the first frame after termination of the active period of the first frame: a comparison circuit configured to compare the counted duration of the blanking period of the first frame with a threshold time required for sensing at least one pixel from the plurality of pixels or a threshold time required to prepare for driving the plurality of pixels during the second frame; and a delay decision circuit configured to determine whether to increase a duration of the blanking period of the first frame based on the comparison.

In one embodiment, a display device comprises: a display panel including a plurality of pixels, a plurality of data lines, and a plurality of gate lines that intersect the plurality of data lines, the plurality of pixels driven during a first frame and during a second frame that is after the first frame, each of the first frame and the second frame including an active period and a blanking period that is after the active period: a data driver configured to provide data voltages to the plurality of data lines during the active period of the first frame and the active period of the second frame, the data voltages corresponding to image data: a gate driver configured to output gate signals to the plurality of gate lines during the active period of the first frame and the active period of the second frame; and a timing controller configured to increase a duration of the blanking period of the first frame responsive to determining that a duration of the blanking period of the first frame is less than at least one of a threshold time required for sensing at least one pixel from the plurality of pixels or a threshold time required to prepare for driving the plurality of pixels during the second frame.

In one embodiment, a display device comprises: a display panel including a plurality of pixels, a plurality of data lines, and a plurality of gate lines that intersect the plurality of data lines, the plurality of pixels driven during a first frame and during a second frame that is after the first frame, and each of the first frame and the second frame including an active period and a blanking period that is after the active period: a data driver configured to provide data voltages to the plurality of data lines during the active period of the first frame and the active period of the second frame, the data voltages corresponding to image data: a gate driver configured to output gate signals to the plurality of gate lines during the active period of the first frame and the active period of the second frame; and a timing controller configured generate a non-synchronization signal responsive to a determining that a duration of the blanking period is less than at least one of a threshold time required for sensing at least one pixel from the plurality of pixels or a threshold time required to prepare for driving the plurality of pixels during the second frame, wherein the non-synchronization signal is indicative that an input active period of the second frame is not synchronized with an output active period of the second frame.

Other embodiment specifics are included in the detailed description and drawings.

According to the display device according to the embodiments, a sensing period and/or driving preparation period during a vertical blanking period may be secured.

However, the effects of the present disclosure are not limited to the above-described effects and other effects which are not described herein may be derived by those skilled in the art from the following description of the embodiments of the present disclosure.

DETAILED DESCRIPTION

Figure 1:
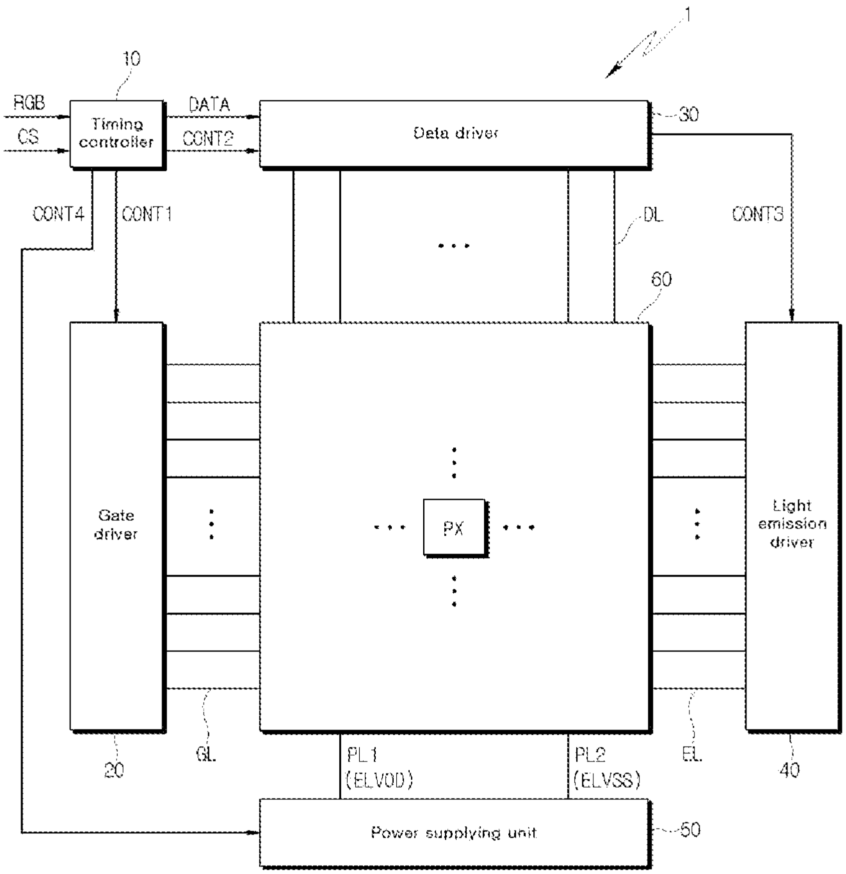
FIG. 1 is a block diagram illustrating a display device according to an embodiment of the present disclosure.

Hereinafter, embodiments are described in more detail with reference to accompanying drawings. When an arbitrary component is described as "being on", "being connected to "or" being linked to" another component, this should be understood to mean that still another component (s) may exist between them, although the arbitrary component may be directly connected to, or linked to, the second component.

Like reference numerals generally denote like elements. In addition, a thickness, ratio, and dimension of each component illustrated in the drawing are exaggerated for convenience of explanation. The term "and/or" includes any and all combinations of one or more of the associated listed items.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. A singular expression includes a plural expression unless a description to the contrary is specifically pointed out in context.

Terms such as 'below', 'at a lower side', 'on', 'at an upper side' and the like are used to describe position relation of parts illustrated in the accompanying drawings. Such terms are of relative concept, and are explained based on the directions marked in the drawings.

It should be understood that terms such as 'comprise', or 'have' and the like are used only to designate that there are features, numbers, steps, operations, components, parts or combination thereof, however such terms do not preclude existence or addition of one or more another features, numbers, steps, operations, components, parts or combination thereof.

FIG. 1 is a block diagram illustrating a display device according to an embodiment of the present disclosure.

Referring to FIG. 1, the display panel 100 may include a timing controller 10, a gate driver 20, a data driver 30, a light emission driver 40, a power supplying unit 50, and a display panel 60.

The timing controller 10 (e.g., a circuit) may receive a video signal (RGB) and a control signal (CS) from an external host system and the like. The video signal (RGB) may include a plurality of grayscale data. The control signal (CS) may include, for example, a horizontal synchronization signal, a vertical synchronization signal and a main clock signal.

The timing controller 10 processes the video signal (RGB) and the control signal (CS) to be suitable to operational conditions of the display panel 60, and may generate and output video data (DATA), a gate driving control signal (CONT1), a data driving control signal (CONT2), an emission driving control signal (CONT3), and a power supply control signal (CONT4).

The gate driving control signal (CONT1) may include a scan timing control signal such as a gate start pulse, a gate shift clock and a gate output enable signal. The data driving control signal (CONT2) may include a data timing control signal such as a source sampling clock, a polarity control signal, a source output enable signal, and the like.

The timing controller 10 may be disposed in a control printed circuit board connected via a flexible flat cable (FFC) or a connecting medium of a flexible printed circuit (FPC) to a source printed circuit board to which the data driver 30 is bonded. For example, the timing controller 10 may be connected to the data driver 30 through an embedded clock P-P interface (EPI) wiring pair to transmit and receive data.

The gate driver 20 (e.g., a circuit) may sequentially output a gate signal by one horizontal period within one frame through a gate line (GL), in response to a gate driving control signal (CONT1) provided by the timing controller 10. Accordingly, a pixel row connected to each gate line (GL) is turned on by one horizontal period. During one horizontal period, a data signal may be applied to a pixel row which is turned on by a gate line (GL).

The gate driver 20 may comprise of stage circuits each of which is connected to a plurality of gate lines (GL), and may be configured in a in a Gate-In-Panel (GIP) method in the display panel 60. The gate driver 20 may include a shift register, or a level shifter, and the like.

The data driver 30 (e.g., a circuit) converts image data (DATA) in a digital format provided by the timing controller 10 into an analogue data signal according to the data driving control signal (CONT2). The data driver 30 may apply the analogue data signal to the corresponding pixels PX through a data line (DL).

The data driver 30 may be configured as a source drive circuit or source drive integrated circuit. The data driver 30 may be connected to a bonding pad of the display panel 60 in a tape automated bonding (TAB) or chip on glass (COG) method, or disposed directly in the display panel 60. In some instances, the data driver 30 may be integrated with the display panel 60.

The light emission driver 40 (e.g., a circuit) may generate light emission signals based on the emission driving control signal (CONT3) output by the timing controller 10. The light emission driver 40 may provide the generated gate signals to the pixels PX through a plurality of emission lines (EL).

The power supplying unit 50 (e.g., a power supplying circuit) may convert a voltage input from the outside into a high potential driving voltage (ELVDD) and a low potential driving voltage (ELVSS), which are standard voltages used inside the display device 1, based on the power supply control signal (CONT4). The power supplying unit 50 may output the generated voltages (ELVDD, ELVSS) to components through power supply lines PL1 and PL2. The power supplying unit 50 may be disposed in the control printed circuit board in which the timing controller 10 is disposed. The power supplying unit 50 may be referred to as a power management integrated circuit (PMIC).

A plurality of pixels PX (or, referred to as sub-pixels) are disposed in the display panel 60. The pixels PX may be, for example, disposed in a form of a matrix in the display panel 60. The pixels PX disposed in one pixel row are connected to the same gate line GL, and the pixels PX disposed in one column are connected to the same data line DL. The pixels PX may emit light at luminance corresponding to the gate signals supplied through the data lines.

In an embodiment, each pixel PX may display one color among red, green and blue. In another embodiment, each pixel PX may display one color among cyan, magenta and yellow. In various embodiments, each pixel PX may display one color among red, green, blue and white.

The timing controller 10, the gate driver 20, the data driver 30, the light emission driver 40, and the power supplying unit 50 each may be configured as a separate integrated circuit (IC), or at least some of them may be integrated into an integrated circuit. Moreover, at least one among the gate driver 20 and the light emission driver 40 may be configured in In-Panel method through which the drivers are integrated into the display panel 60.

The display device 1 according to the embodiment of the present disclosure may operate by using a variable refresh rate (VRR) mode by which the driving frequencies can be varied. The refresh rate may mean an interval/frequency at which the data voltage is supplied (programmed) to the pixels. For example, the display device 1 may be driven at a refresh rate which is lower or higher than a certain reference refresh rate. Driving the display device 1 at a refresh rate that is less than a reference refresh rate may be referred to as 'a low speed driving', and driving the display device 1 at a refresh rate that is greater than the reference refresh rate may be referred to as 'a high speed driving'. At low speed driving, the display device 1 programs data voltages in pixels at a lower interval/frequency than the reference refresh rate, and at high speed driving, the display device 1 programs data voltages in pixels at a higher interval/frequency than the reference refresh rate. The refresh rate may be determined according to kinds of images being displayed and the like, but is not limited thereto.

Figure 2:
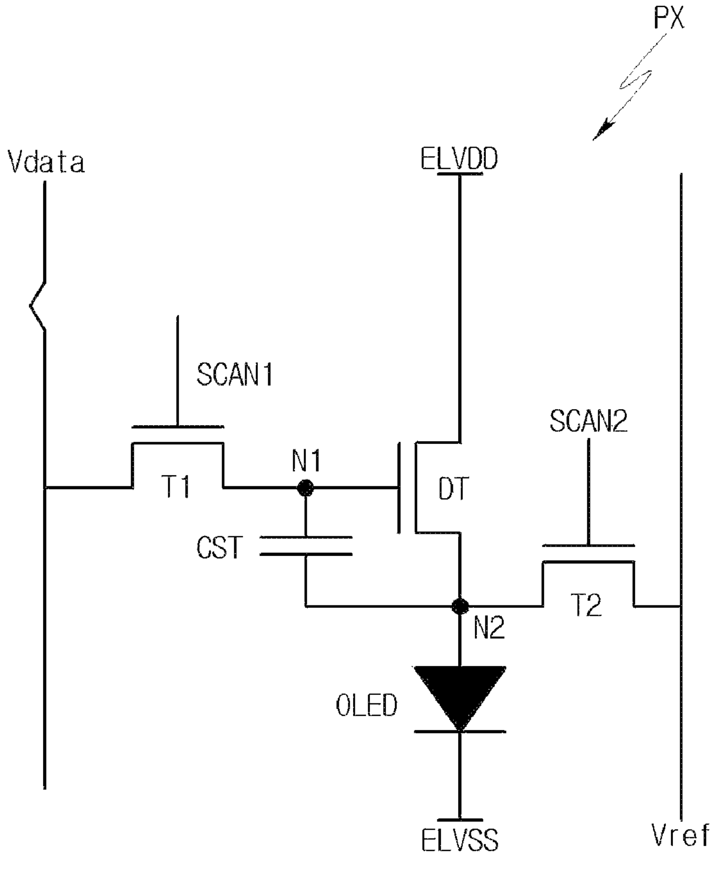
FIG. 2 is a pixel circuit diagram illustrating a pixel circuit of a display device according to an embodiment of the present disclosure.

FIG. 2 is a pixel circuit diagram illustrating a pixel circuit of a display device according to an embodiment of the present disclosure.

FIG. 2 illustratively shows the pixel for description, and there is no limitation as long as the pixel has a structure which can control the light emission of the organic light-emitting diodes (OLED). For example, the pixel PX may further include an additional switching TFT, and the connection relationship of the switching TFT or positions to which capacitors are connected may vary variously.

Referring to FIG. 2, the pixel PX according to an embodiment may include pixels PX having driving transistors DT and organic light-emitting diodes OLED connected to the pixels PX.

The pixels PX may drive organic light-emitting diodes OLED by controlling a driving current flowing in the organic light-emitting diodes OLED. The pixel PX may include a driving transistor DT, a scan transistor T1, an initialization transistor T2, and a storage capacitor CST. Each of the transistors DT and T1 to T2 may include a respective first electrode, a respective second electrode, and a respective gate electrode. One among the first electrode and the second electrode may be a source electrode, and the other among them may be a drain electrode.

Each of the transistors DT and T1 to T2 may be a PMOS transistor or an NMOS transistor. Hereinafter, it will be mainly described that each of the transistors DT and T1 to T2 is an NMOS transistor. Accordingly, the transistors DT and T1 to T2 may be turned on when a high-level voltage is applied thereto.

The OLED may include an anode electrode and a cathode electrode. The anode electrode of the OLED may be connected to a second node N2, and a cathode electrode may be connected to the low potential driving voltage (ELVSS).

The driving transistor DT may include the first electrode receiving the high potential driving voltage (ELVDD), the second electrode connected to the second node N2, and the gate electrode connected to a first node N1. The driving transistor DT may provide the driving current to the OLED based on a voltage of the first node N1 (or, the data voltage stored in the storage capacitor CST to be described later).

A first transistor T1 may include the first electrode receiving the data voltage Vdata, the second electrode connected to the first node N1, and the gate electrode receiving a first scan signal SCAN1 through one gate line GL among the gate lines (GL in FIG. 1). The first transistor T1 may be turned on in response to the scan signal SCAN1 and may transmit the data voltage Vdata to the first node N1.

A second transistor T2 may include the first electrode receiving an initialization voltage Vref, the second electrode connected to the second node N2, and the gate electrode receiving the second scan signal SCAN2 through one gate line GL among the gate lines (GL in FIG. 1). The second transistor T2 may be turned on in response to the scan signal SCAN2 and may transmit the data voltage Vdata to the second node N2.

The storage capacitor CST may be connected between the first node N1 and a second node N2. The storage capacitor CST may store or maintain a difference voltage obtained between the data voltage Vdata supplied to the first node N1 and the initialization voltage Vref supplied to the second node N2.

Figure 3:
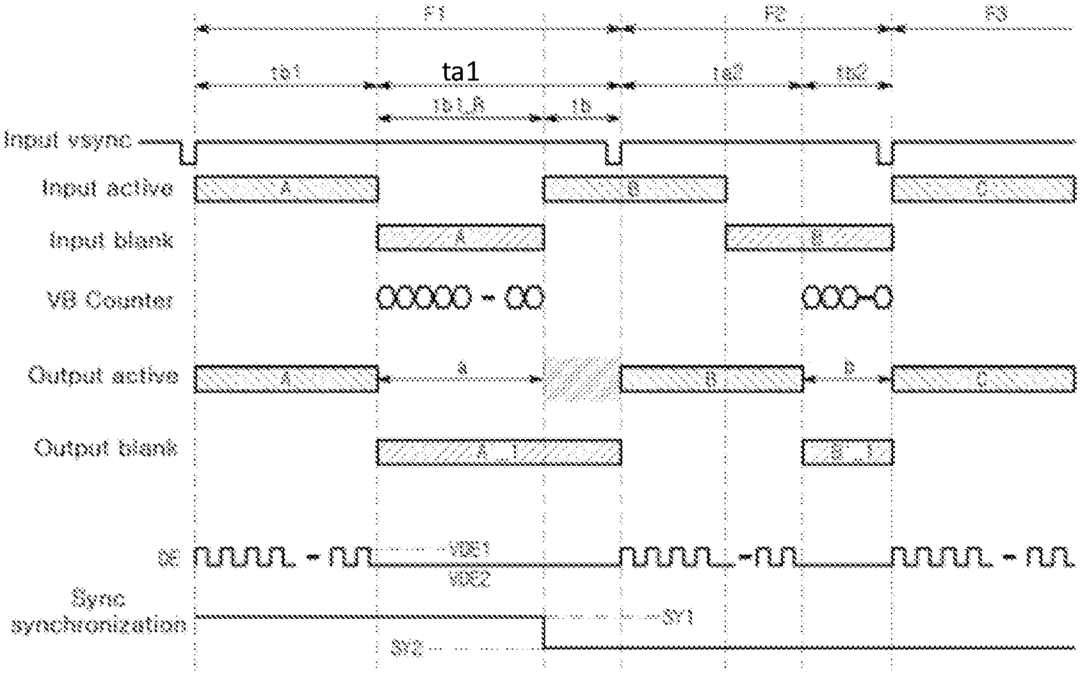
FIG. 3 is a waveform diagram illustrating signals input to a display device according to an embodiment of the present disclosure.
Figure 4:
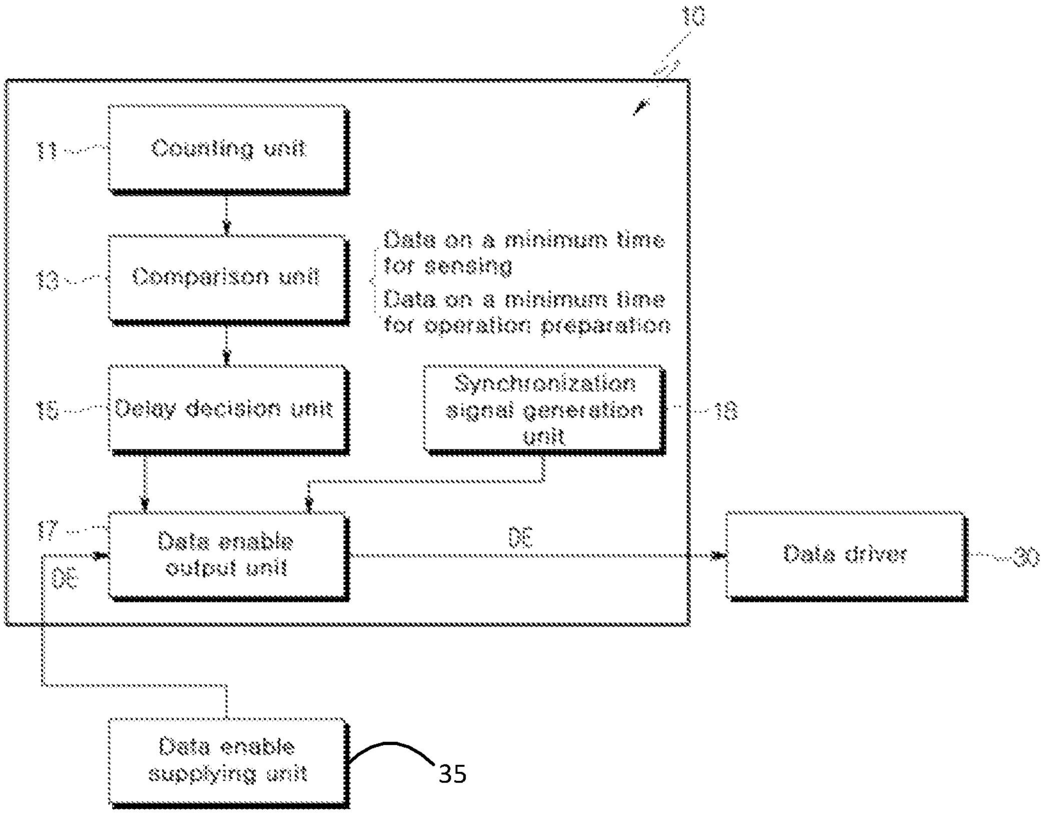
FIG. 4 is a view illustrating configuration of a timing controller 10 according to an embodiment.
Figure 5:
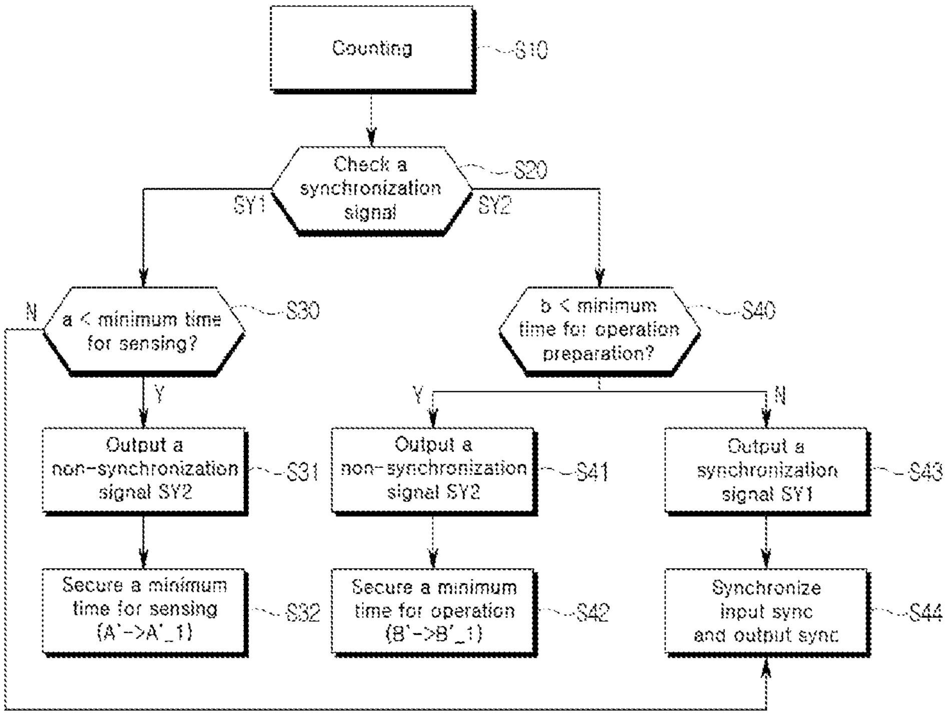
FIG. 5 is a flowchart illustrating a driving method of a display device according to an embodiment.
Figure 6:
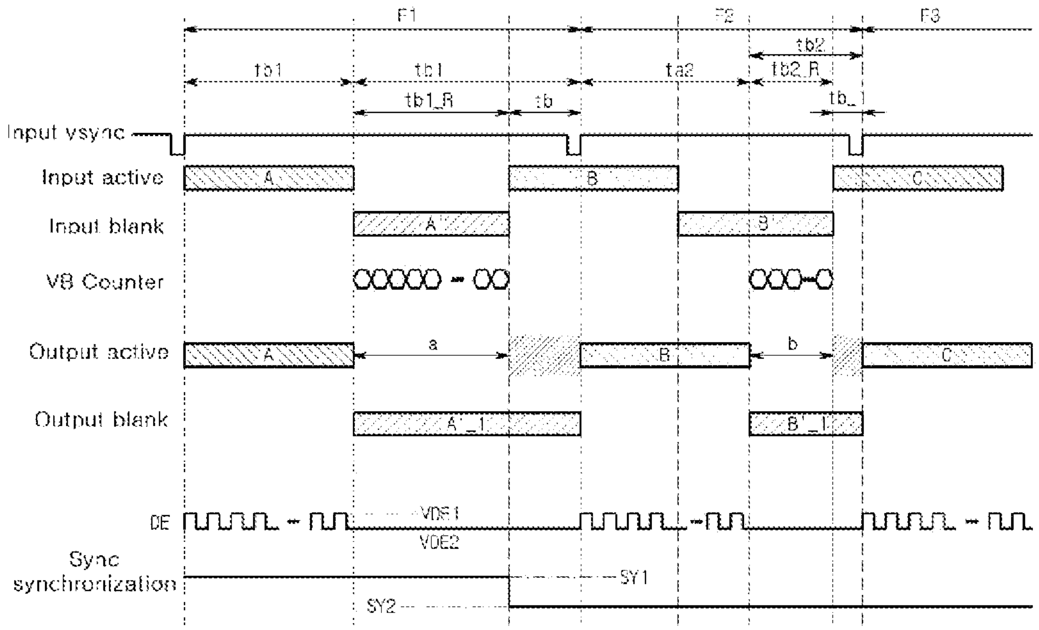
FIG. 6 is a waveform diagram illustrating signals input to a display device according to a modification of an embodiment.

FIG. 3 is a waveform diagram illustrating signals input to a display device according to an embodiment of the present disclosure. FIG. 4 is a view illustrating configuration of a timing controller 10 according to an embodiment. FIG. 5 is a flowchart illustrating a driving method of a display device according to an embodiment. FIG. 6 is a waveform diagram illustrating signals input to a display device according to a modification of an embodiment.

FIG. 3 shows first to third frames F1 to F3 as an example, and before each of the first to third frames F1 to F3 starts, an input horizontal sync signal vsync is input. Each frame is a period of time during which an image is displayed by the display panel 60 at a corresponding driving frequency. For example, the first frame F1 has a first driving frequency a1 Hz, the second frame F2 has a second driving frequency a2 Hz, and the third frame F3 has a third driving frequency a3 Hz. For example, the first driving frequency a1 Hz may be about 144 Hz, the second driving frequency a2 Hz may be about 144 Hz, and the third driving frequency a3 Hz may be about 120 Hz, but are not limited thereto.

Referring to FIGS. 1 to 6, each of the first to third frames F1 to F3 may include an active period and a blanking period. FIG. 3 illustrates active periods ta1 to ta2 and blanking periods tb1 to tb2. During the active period ta1 to ta2, the scan transistor T1 of FIG. 2 is turned on and the data voltage Vdata may be input to the first node N1.

The timing controller 10 may include, for example, a counting unit 11 (e.g., a circuit), a comparison unit 13 (e.g., a circuit), a delay decision unit 15 (e.g., a circuit), a data enable output unit 17 (e.g., a circuit), and a synchronization signal generation unit 18 (e.g., a circuit).

Although not illustrated, image data (DATA in FIG. 1) may be provided to the data driver 30 through a data enable output unit 17 of the timing controller 10 during the active period ta1 to ta2. The image data provided to the data driver 30 may be converted into a corresponding data voltage in an analog format by the data driver 30 and may be provided to the pixels PX. FIG. 3 shows an input active period, an input blanking period, an output active period, and an output blanking period. The previously described active periods ta1 to ta2 and blanking periods tb1 to tb2 may mean an output active period and an output blanking period.

The input active period may be a period in which a data enable supplying unit 35 (e.g., a circuit) of an external device of the timing controller 10 in FIG. 4 reads data enable signals to be provided to the data enable output unit 17 from an external memory. In FIG. 3, input active periods A, B, and C are illustrated.

The input blank period may be a period obtained by subtracting the input active period from the predetermined duration of the frames F1 to F3. In FIG. 3, input blank periods A' and B' are exemplified.

The output active period may be a period in which the data enable supplying unit 35 of the external device of the timing controller 10 in FIG. 4 supplies data enable signals to the data enable output unit 17. In FIG. 3, output active periods A, B, and C or first and second active periods ta1 and ta2 are exemplified.

The output blank period may be a period obtained by subtracting the output active period from the duration of the frames F1 to F3 determined by the delay decision unit 15. In FIG. 3, output blanking periods A'_1 and B'_1 are exemplified.

In the first active period ta1, the input active period and the output active period (or the first active period ta1) may be synchronized. Synchronization of the input active period and the output active period (or the first active period ta1) may be controlled by the synchronization signal generation unit 18. When a synchronization signal SY1 is provided to the data enable output unit 17 by the synchronization signal generation unit 18, the data enable output unit 17 is synchronized with the input active period in the first active period ta1, and may supply the data enable signal DE to the data driver 30. The data enable signal DE may have a first voltage level VDE1 and a second voltage level VDE2 that is less than the first voltage level VDE1 that are repeated according to interval of the horizontal synchronization signal hsync. The scan transistor T1 may be turned on in response to the data enable signal DE at the first voltage level VDE1 and the data voltage Vdata may be supplied from the first electrode.

After termination of the first active period ta1, the first blanking period tb1 begins. In the first blanking period tb1, the data enable signal DE is maintained at the second voltage level VDE2. The counting unit 11 counts a duration (a) of the first blanking period tb1 in the first blanking period tb1 (refer to S10 in FIG. 5). The counting unit 11 provides data on the counted duration (a) of the first blanking period tb1 to the comparison unit 13. After counting (refer to S10), the comparison unit 13 checks a synchronization signal (refer to S20 in FIG. 5).

In the comparison unit 13, data on a minimum time (e.g., a threshold time) required for sensing a pixel and data on a minimum time for preparing driving is stored. In the present disclosure, data on a minimum time for sensing may be data on a threshold time required for sensing some pixels PX of the display panel 60. For example, the data on a minimum time for sensing may be data on a minimum time required for sensing characteristics of pixels PX of at least one color (for example, red, green, blue, or white) of one pixel row of the display panel 60. The characteristics may be a threshold voltage of the driving transistor DT and the mobility of the driving transistor DT, for example. The data on a minimum time for preparing driving may be data on a threshold time required for reading image data output through the image data output unit from a storage medium of an external device during the second active period ta2 of the next frame (e.g., F2) and storing the data in the memory of the timing controller 10. As a result of the synchronization signal check (S20), when the synchronization signal SY1 is provided to the data enable output unit 17 by the synchronization signal generation unit 18, the sensing of the display device and the driving preparation of the display device may be performed in the first blanking period tb1. For example, the sensing of the display device may be sensing of a mobility value of the driving transistor DT, but is not limited thereto. Since sensing of the mobility value of the driving transistor DT is a technique widely known in the art, a detailed description thereof will be omitted.

As a result of the synchronization signal check (S20), when the synchronization signal SY1 is provided to the data enable output unit 17 by the synchronization signal generation unit 18, the comparison unit 13 compares the counted duration (a) of the first blanking period tb1 with the minimum time for sensing (refer to S30). The minimum time for preparing driving may be shorter than the minimum time for sensing. When it is determined that the counted duration (a) of the first blanking period tb1 is longer than the minimum time for sensing (refer to N), the delay decision unit 15 controls the synchronization signal generation unit 18 to provide a synchronization signal SY1 to the data enable output unit 17. After termination of the first blanking period tb1_R, the data enable supplying unit 35 of the external device reads data enable signals to be provided to the data enable output unit 17 from an external memory according to the synchronization signal SY1. At the same time, the data enable supply unit of the external device supplies the data enable signals DE to the data enable output unit 17 (input active period=output active period, refer to synchronization of an input/output sync (S43) in FIG. 5). The supply of the data enable signals DE to the data enable output unit 17 of the data enable supplying unit 35 of the external device may be performed simultaneously with the supply of the data enable signal DE from the data enable output unit 17 to the data driver 30.

On the other hand, when it is determined that the counted duration (a) of the first blanking period tb1_R is shorter than the minimum time for sensing (refer to Y in FIG. 5), the delay decision unit 15 controls the synchronization signal generation unit 18 to provide the non-synchronization signal SY2 to the data enable output unit 17 (refer to S31 in FIG. 5). After termination of the first blanking period tb1_R, the data enable supplying unit 35 of the external device reads data enable signals to be provided to the data enable output unit 17 from an external memory according to the non-synchronization signal SY2 (input active period (e.g. B)). However, a period in which the data enable signals are supplied by the data enable supply unit of the external device to the data enable output unit 17 (output active period B (or, a second active period ta2)) may be delayed by as much as a first time of delay tb, compared with the input active period B. In other words, when it is determined that the duration (a) of the counted first blanking period tb1_R is shorter than the minimum time for sensing, the delay decision unit 15 may extend the duration of the first blanking period by as much as the first time of delay tb (tb1_R->tb1) (refer to S32). In one embodiment, at least one of the sensing of the pixels and preparing the driving of the pixels for driving during the second frame are performed during the first blanking period with the increased duration. As a result of extending the duration of the blanking period, a second input active period B and a second output active period B or ta2 of the second frame F2 may be unsynchronized (e.g., not synchronized).

The delay decision unit 15 controls the synchronization signal generation unit 18 to provide a non-synchronization signal SY2 to the data enable output unit 17, and at the same time, calculates the first time of delay tb. The first time of delay tb may be equal to an above-described difference between the counted duration (a) of the first blanking period tb1_R and the minimum time (e.g., threshold time) for sensing the characteristic of pixels or the difference between the counted duration (a) of the first blanking period tb1_R and the minimum time (e.g., threshold time) to prepare for driving the pixels during the second frame F2.

After termination of the first blanking period tb1, the second active period ta2 of the second frame F2 begins. The second active period ta2 may be unsynchronized with the second input active period B by the non-synchronization signal SY2. Thus, the non-synchronization signal SY2 indicates that the input active period B of the second frame F2 is not synchronized with the output active period B of the second frame F2 as shown in FIG. 3. In the second active period ta2, the delay decision unit 15 may provide data on the calculated first time of delay tb to the data enable output unit 17, and in the second active period ta2, the data enable output unit 17 may supply the unsynchronized data enable signal DE that is delayed by as much as the first time of delay tb to the data driver 30. The data enable signal DE may have the first voltage level VDE and the second voltage level VDE2 being repeated according to an interval of the horizontal synchronization signal hsync. The scan transistor T1 may be turned on in response to the data enable signal DE at the first voltage level VDE1 and the data voltage Vdata may be supplied from the first electrode.

After termination of the second active period ta2, the second blanking period tb2 begins. In the second blanking period tb2, the data enable signal DE at the second voltage level VDE2 is maintained. The counting unit 11 counts a duration (b) of the second blanking period tb2 in the second blanking period tb2 (refer to S10 in FIG. 5). The counting unit 11 provides data on the counted duration (b) of the second blanking period tb2 to the comparison unit 13. After counting (refer to S10), the comparison unit 13 checks a synchronization signal (refer to S20 in FIG. 5). In the comparison unit 13, data on a minimum time required for sensing and data on a minimum time for preparing driving is stored. In the present disclosure, data on a minimum time for sensing may be data on a threshold time required for sensing some pixels PX of the display panel 60. For example, the data on a minimum time for sensing may be data on a threshold time required for sensing pixels PX of at least one color (for example, red, green, blue, or white) of one pixel row of the display panel 60. The data on a minimum time for preparing driving may be data on a threshold time required for reading image data (refer DATA in FIG. 1) output through the image data output unit from a storage medium of an external device during the second active period ta2 of the next frame (e.g., F2) and storing the data in the memory of the timing controller 10.

As a result of the synchronization signal check (S20), when the non-synchronization signal SY2 is provided to the data enable output unit 17 by the synchronization signal generation unit 18 due to the non-synchronization, only the driving preparation of the display device may be performed in the second blanking period tb2 without performing the sensing of the display device.

As a result of the synchronization signal check (S20), when the non-synchronization signal SY2 is provided to the data enable output unit 17 by the synchronization signal generation unit 18, the comparison unit 13 compares the counted duration (b) of the second blanking period tb2 with the minimum time for sensing. (refer to S40 in FIG. 5) As illustrated in FIGS. 3 and 5, when it is determined that the counted duration (b) of the second blanking period tb2 is longer than the minimum time for preparing driving (refer to N in FIG. 5), the delay decision unit 15 controls the synchronization signal generation unit 18 to provide a synchronization signal SY1 to the data enable output unit 17 (refer to S43 in FIG. 5). After termination of the second blanking period tb2, the data enable supplying unit 35 of the external device reads data enable signals to be provided to the data enable output unit 17 from an external memory according to the synchronization signal SY1. At the same time, the data enable supply unit of the external device supplies the data enable signals to the data enable output unit 17 (input active period=output active period, refer to synchronization of an input/output sync (S44) in FIG. 5). The supply of the data enable signals to the data enable output unit 17 of the data enable supply unit of the external device may be performed simultaneously with the supply of the data enable signal DE from the data enable output unit 17 to the data driver 30.

On the other hand, as illustrated in FIG. 6, when it is determined that the counted duration (b) of the second blanking period tb2_R is shorter than the threshold time for preparing driving (refer to Y in FIG. 5), the delay decision unit 15 controls the synchronization signal generation unit 18 to provide the non-synchronization signal SY2 to the data enable output unit 17 (refer to S41 in FIG. 5). After termination of the second blanking period tb2_R, the data enable supply unit of the external device reads data enable signals to be provided to the data enable output unit 17 from an external memory according to the non-synchronization signal SY2 (input active period (e.g. C)). However, a duration of a period in which the data enable signals are supplied by the data enable supply unit of the external device to the data enable output unit 17 (output active period B (or, a third active period, C)) may be increased by as much as a second time of delay tb_1, compared with the input active period C. In other words, when it is determined that the duration (b) of the counted second blanking period tb2_R is shorter than the minimum time for preparing driving, the delay decision unit 15 may increase the duration of the second blanking period by as much as the second time of delay tb_1 (tb2_R->tb2)(refer to S42). This results in the third active period C and the third output active period C being unsynchronized.

The delay decision unit 15 controls the synchronization signal generation unit 18 to provide a non-synchronization signal SY2 to the data enable output unit 17, and at the same time, calculates the second time of delay tb_1. The second time of delay tb_1 may be equal to an above-described difference between the counted duration (b) of the second blanking period tb2_R and the minimum time for preparing driving.

According to an embodiment, as described above, it is possible to secure a blanking period equal to or greater than the minimum time for sensing pixels or the minimum time for preparing driving, by measuring a duration of the blanking period of the current frame, comparing the measured duration of the blanking period with the minimum time for sensing or the minimum time for preparing driving, and extending the blanking period of the corresponding frame when it is determined that the duration of the blanking period is shorter than the minimum time for sensing or the minimum time for preparing driving. By doing so, sensing or driving preparation of the display device may be sufficiently performed in the display device having different driving frequencies.

Hereinafter, the display device according to another embodiment is described.

Figure 7:
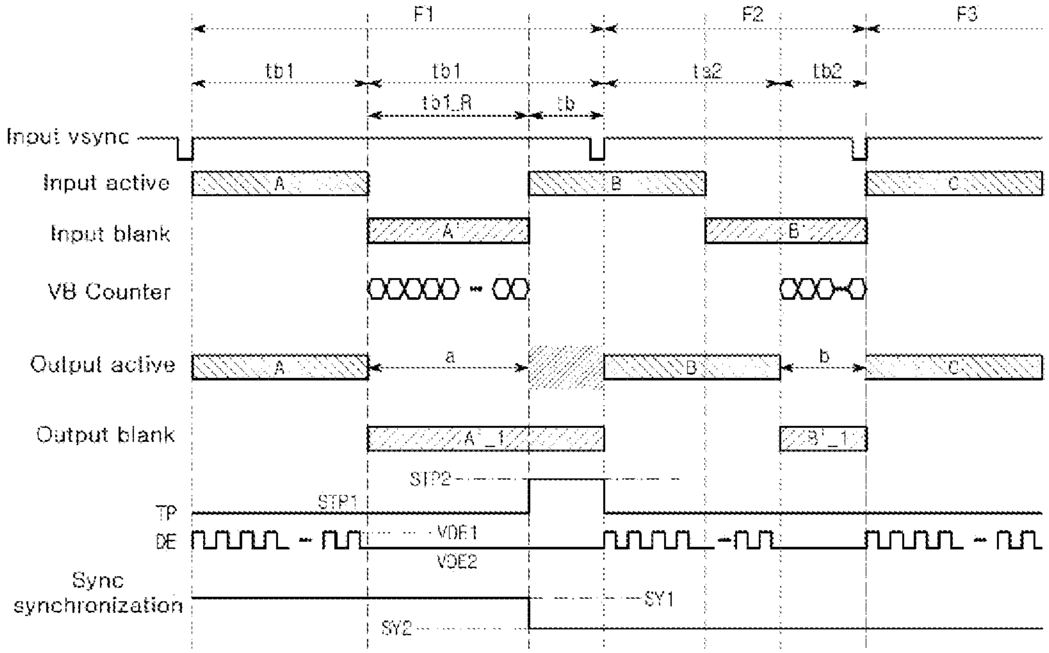
FIG. 7 is a waveform diagram illustrating signals input to a display device according to another embodiment.
Figure 8:
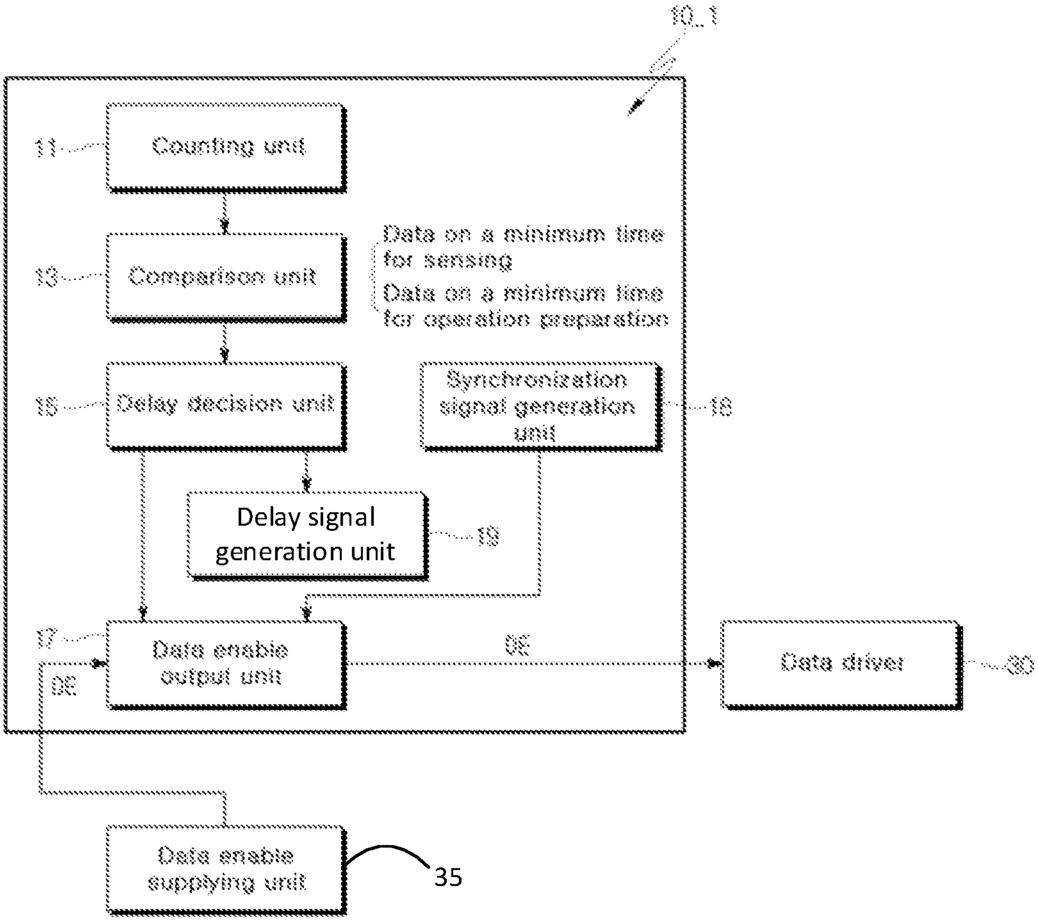
FIG. 8 is a view illustrating configuration of a timing controller 10 according to another embodiment.
Figure 9:
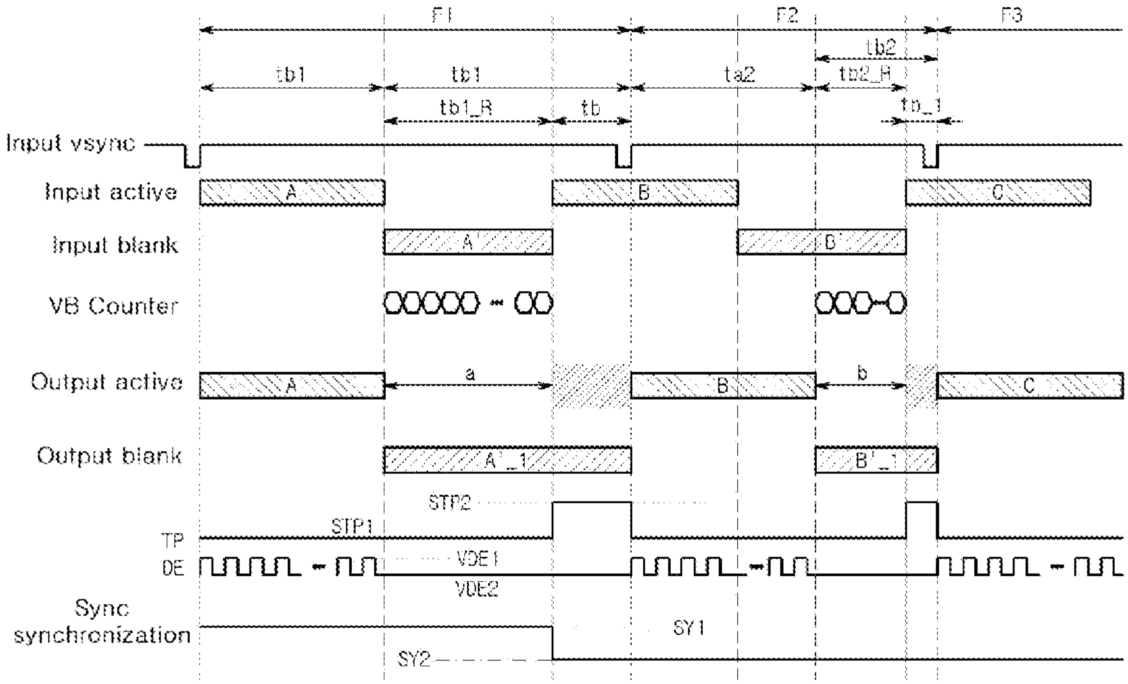
FIG. 9 is a waveform diagram illustrating signals input to a display device according to a modification of the another embodiment.

FIG. 7 is a waveform diagram illustrating signals input to the display device according to another embodiment. FIG. 8 is a view illustrating configuration of the timing controller 10 according to another embodiment. FIG. 9 is a waveform diagram illustrating signals input to the display device according to a modification of the another embodiment.

Referring to FIGS. 7 to 9, a timing controller 10_1 may further include a delay signal generation unit 19. The delay signal generation unit 19 may generate a delay signal TP. The delay signal TP may have a second voltage level STP2 in the time of delay tb and tbd_1 in the blanking period (tb1 in FIG. 3, tb2 in FIG. 5), and may have a first voltage level STP1 in the remaining period. The delay signal TP at the second voltage level STP2 may overlap the non-synchronization signal SY2, and may not overlap the synchronization signal SY1. The delay decision unit 15 provides data on the time of delay tb and tb_1 to the delay signal generation unit 19, when the time of delay tb and tb_1 described in FIGS. 3 to 6 is calculated.

The other descriptions are described above with reference to FIGS. 3 to 6, a detailed description thereof is omitted.

For example, a display device may include: a first frame, a second frame, and a third frame each including an active period and a blanking period: a counting unit configured to count a duration of a blanking period of the first frame after termination of an active period of the first frame; a comparison unit configured to compare the counted duration of the blanking period of the first frame with a minimum time for sensing or a minimum time for preparing driving: and a delay decision unit configured to determine whether to delay the blanking period of the first frame based on the comparison result of the comparison unit.

For example, the display device may further include: a synchronization signal generation unit, and the synchronization signal generation unit may generate a non-synchronization signal when the delay decision unit determines to delay the blanking period of the first frame.

For example, the synchronization signal generation unit may generate a synchronization signal when the delay decision unit determines not to delay the blanking period of the first frame.

For example, the synchronization signal generation unit may calculate a time of delay of the blanking period of the first frame by comparing the minimum time for sensing or the minimum time for preparing driving with the duration of the blanking period of the first frame.

For example, the display device may further include: a data enable output unit, and the data enable output unit may provide a data enable signal delayed according to data on the time of delay calculated by the delay decision unit and the non-synchronization signal, when the delay decision unit determines to delay the blanking period of the first frame.

For example, the display device may further include: a data enable output unit, and the data enable output unit may provide a data enable signal synchronized during the active period of the second frame, when the delay decision unit determines not to delay the blanking period of the first frame.

For example, the minimum time for sensing may be a minimum time required for sensing pixels of a display panel.

For example, the display device may further include: a plurality of pixels: a data driver configured to convert a data voltage provided to the pixels into image data: and an image data output unit configured to output the image data to the data driver.

For example, the minimum time for preparing driving may be a minimum time required for reading the image data provided by the second frame to the data driver from a storage medium of an external device and storing the image data in a memory device.

The present disclosure has been described in more detail with reference to the exemplary embodiments, but the present disclosure is not limited to the exemplary embodiments. It will be apparent to those skilled in the art that various modifications can be made without departing from the technical sprit of the invention. Accordingly, the exemplary embodiments disclosed in the present disclosure are used not to limit but to describe the technical spirit of the present disclosure, and the technical spirit of the present disclosure is not limited to the exemplary embodiments. Therefore, the exemplary embodiments described above are considered in all respects to be illustrative and not restrictive. The protection scope of the present disclosure must be interpreted by the appended claims and it should be interpreted that all technical spirits within a scope equivalent thereto are included in the appended claims of the present disclosure.

REFERENCE NUMERALS

1: display device
10: timing controller
20: gate driver
30: data driver
40: light emission driver
50: power supplying unit
60: display panel

What is claimed is:

1. A display device, comprising:

a display panel including a plurality of pixels configured to display images during a first frame, a second frame that is after the first frame, and a third frame that is after the second frame, each of the first frame, the second frame, and the third frame including an active period and a blanking period that is after the active period, the display panel operating at a first refresh rate, a second refresh rate, and a third refresh rate during the first frame, the second frame, and the third frame, respectively;

a counting circuit configured to count a duration of the blanking period of the first frame after termination of the active period of the first frame, the blanking period being a reference blanking period corresponding to the first frequency;

a comparison circuit configured to compare the counted duration of the blanking period of the first frame with a threshold time required for sensing at least one pixel from the plurality of pixels or a threshold time required to prepare for driving the plurality of pixels during the second frame; and a delay decision circuit configured to determine whether to increase a duration of the blanking period of the first frame based on the comparison to be greater than the reference blanking period corresponding to the first frequency, wherein the threshold time required for sensing the at least one pixel is a time required to sense a characteristic of the at least one pixel, the characteristic including at least one of a threshold voltage of a driving transistor of the at least one pixel or a mobility of the driving transistor, and wherein the threshold time required to prepare for driving is a duration of time required for reading image data that is provided during the second frame to a data driver from a storage medium of an external device and storing the image data in a memory device.

2. The display device of claim 1, further comprising:

a synchronization signal generation circuit configured to generates a non-synchronization signal changing from a first logic level to a second logic level responsive to determining to increase the duration of the blanking period of the first frame, the non-synchronization signal indicative that an input active period of the second frame is not synchronized with an output active period of the second frame due to the increase in the duration of the blanking period of the first frame.

3. The display device of claim 2, wherein the synchronization signal generation circuit is configured to generate a synchronization signal responsive to a determination not to increase the duration of the blanking period during the first frame, the synchronization signal indicative that the input active period of the second frame is synchronized with the output active period of the second frame due to the duration of the blanking period of the first frame being maintained.

4. The display device of claim 3, wherein the synchronization signal generation circuit is configured to calculate a time of delay of the blanking period of the first frame that is used to increase the duration of the blanking period of the first frame based on a difference between the duration of the blanking period of the first frame and the threshold time required for sensing of the at least one pixel, or a difference between the duration of the blanking period of the first frame and the threshold time required to prepare for driving the plurality of pixels during the second frame.

5. The display device of claim 4, further comprising:

a data enable output circuit configured to provide a data enable signal that is delayed according to the time of delay to a data driver responsive to the determination to increase the duration of the blanking period during the first frame.

6. The display device of claim 5, wherein the data enable output circuit is further configured to provide to the data driver the data enable signal that is synchronized with the active period of the second frame responsive to the determination not to increase the duration of the blanking period during the first frame.

7. The display device of claim 1, further comprising:

the data driver configured to convert a data voltage provided to the plurality of pixels into the image data corresponding to the images; and an image data output circuit configured to output the image data to the data driver.

8. A display device comprising:

a display panel including a plurality of pixels, a plurality of data lines, and a plurality of gate lines that intersect the plurality of data lines, the plurality of pixels driven during a first frame and during a second frame that is after the first frame, each of the first frame and the second frame including an active period and a blanking period that is after the active period, the display panel operating at a first refresh rate, a second refresh rate, and a third refresh rate during the first frame, the second frame, and the third frame, respectively;

a data driver configured to provide data voltages to the plurality of data lines during the active period of the first frame and the active period of the second frame, the data voltages corresponding to image data;

a gate driver configured to output gate signals to the plurality of gate lines during the active period of the first frame and the active period of the second frame; and a timing controller configured to increase a duration of the blanking period of the first frame to be greater than a reference blanking period corresponding to the first frequency responsive to determining that the duration of the blanking period of the first frame is less than at least one of a threshold time required for sensing at least one pixel from the plurality of pixels or a threshold time required to prepare for driving the plurality of pixels during the second frame, wherein sensing the at least one pixel comprises sensing at least one of a mobility of a driving transistor of the at least one pixel and a threshold voltage of the driving transistor, and wherein preparing for driving the plurality of pixels during the second frame comprises reading the image data that is provided to the data driver during the second frame from a storage medium of an external device, and storing the image data in a memory device.

9. The display device of claim 8, wherein a driving frequency of the first frame is different from a driving frequency of the second frame.

10. The display device of claim 8, wherein sensing of the at least one pixel from the plurality of pixels and preparing for driving the plurality of pixels during the second frame are performed during the blanking period of the first frame that has the increased duration.

11. The display device of claim 8, wherein the timing controller is configured to count a duration of the blanking period of the first frame after the active period of the first frame and determine a difference between the duration of the blanking period of the first frame and the threshold time required for sensing the at least one pixel or the threshold time required to prepare for driving the plurality of pixels during the second frame to determine that the duration of the blanking period of the first frame is less than the threshold time required for sensing the at least one pixel or the threshold time required to prepare for driving the plurality of pixels during the second frame.

12. The display device of claim 8, wherein the timing controller is configured to maintain the duration of the blanking period of the first frame responsive to determining that the duration of the blanking period is greater than or equal to at least one of the threshold time required for sensing the at least one pixel or the threshold time required to prepare for driving the plurality of pixels during the second frame.

13. The display device of claim 12, wherein the timing controller is configured to generate a non-synchronization signal changing from a first logic level to a second logic level responsive to determining that the duration of the blanking period is less than at least one of the threshold time required for sensing at least one pixel from the plurality of pixels or the threshold time required to prepare for driving the plurality of pixels during the second frame, the non-synchronization signal indicative that an input active period of the second frame is not synchronized with an output active period of the second frame due to the increase in the duration of the blanking period of the first frame, wherein the timing controller is configured to generate a synchronization signal responsive to determining that the duration of the blanking period is greater than or equal to at least one of the threshold time required for sensing the at least one pixel or the threshold time required to prepare for driving the plurality of pixels during the second frame, the synchronization signal indicative that the input active period of the second frame is synchronized with the output active period of the second frame due to the duration of the blanking period of the first frame being maintained.

14. The display device of claim 13, wherein during the input active period a device external to the timing controller reads data enable signals from an external memory, and during the output active period the timing controller receives the data enable signals from the external device.

15. A display device comprising:

a display panel including a plurality of pixels, a plurality of data lines, and a plurality of gate lines that intersect the plurality of data lines, the plurality of pixels driven during a first frame and during a second frame that is after the first frame, and each of the first frame and the second frame including an active period and a blanking period that is after the active period, the display panel operating at a first refresh rate, a second refresh rate, and a third refresh rate during the first frame, the second frame, and the third frame, respectively;

a data driver configured to provide data voltages to the plurality of data lines during the active period of the first frame and the active period of the second frame, the data voltages corresponding to image data;

a gate driver configured to output gate signals to the plurality of gate lines during the active period of the first frame and the active period of the second frame; and a timing controller configured generate a non-synchronization signal changing from a first logic level to a second logic level responsive to a determining that a duration of the blanking period is less than at least one of a threshold time required for sensing at least one pixel from the plurality of pixels or a threshold time required to prepare for driving the plurality of pixels during the second frame, wherein the non-synchronization signal is indicative that an input active period of the second frame is not synchronized with an output active period of the second frame, a data enable signal being read during the input active period and the data enable signal being supplied to the data driver during the output active period, wherein the threshold time required for sensing the at least one pixel is a time required to sense a characteristic of the at least one pixel, the characteristic including at least one of a threshold voltage of a driving transistor of the at least one pixel or a mobility of the driving transistor, and wherein the threshold time required to prepare for driving is a duration of time required for reading the image data that is provided during the second frame to the data driver from a storage medium of an external device and storing the image data in a memory device.

16. The display device of claim 15, wherein during the input active period a device external to the timing controller reads data enable signals from an external memory, and during the output active period the timing controller receives the data enable signals from the external device.

17. The display device of claim 15, wherein the timing controller is further configured to increase the duration of the blanking period of the first frame responsive to determining that the duration of the blanking period is less than at least one of the threshold time required for sensing the at least one pixel or the threshold time required to prepare for driving the plurality of pixels during the second frame.

18. The display device of claim 15, wherein during the blanking period of the second frame, preparing for driving of the plurality of pixels during a third frame is performed without performing the sensing of the at least one pixel during the blanking period of the second frame.

19. The display device of claim 18, wherein the timing controller is configured to increase a duration of the blanking period of the second frame responsive to determining that the duration of the blanking period of the second frame is less than the threshold time required for preparing for driving of the plurality of pixels during the third frame.

* * * * *